United States Patent [19]

Zachrich

[11] 4,305,695
[45] Dec. 15, 1981

[54] ROLLOUT TRAY FOR PANEL TRUCK BED

[76] Inventor: Wayne H. Zachrich, 6143 Holly Glenn Dr., Toledo, Ohio 43612

[21] Appl. No.: 139,810

[22] Filed: Apr. 14, 1980

[51] Int. Cl.$^3$ ............................................. B60P 1/64
[52] U.S. Cl. .................................. 414/522; 296/37.1
[58] Field of Search .................. 296/37.1, 37.16, 26; 224/42.44, 281; 414/522; 312/330 R; 220/22.3, 22.1

[56] References Cited

U.S. PATENT DOCUMENTS

| 1,823,285 | 9/1931 | Petrisch | 220/22.3 |
| 2,549,018 | 4/1951 | Sarlo | 296/26 |
| 2,784,027 | 3/1957 | Temp | 296/26 |
| 2,852,303 | 9/1958 | Hopson | 296/26 |
| 3,006,487 | 10/1961 | Gelli | 414/522 |
| 3,067,903 | 12/1962 | Jones, Jr. | 220/22.1 |
| 3,726,422 | 4/1973 | Zelin | 296/37.1 |

Primary Examiner—Robert R. Song
Attorney, Agent, or Firm—Paul F. Stutz

[57] ABSTRACT

Panel truck modification comprising a slide or rollout tray generally coextensive in size with the bed of the truck, the tray featuring an ajustable array of cleats or linear members dividing the tray into compartments and an array of castors between the deck and the tray to provide the slide or rollout feature together with combined guide and support means situate along the margins of said truck bed.

6 Claims, 3 Drawing Figures

U.S. Patent
Dec. 15, 1981
4,305,695
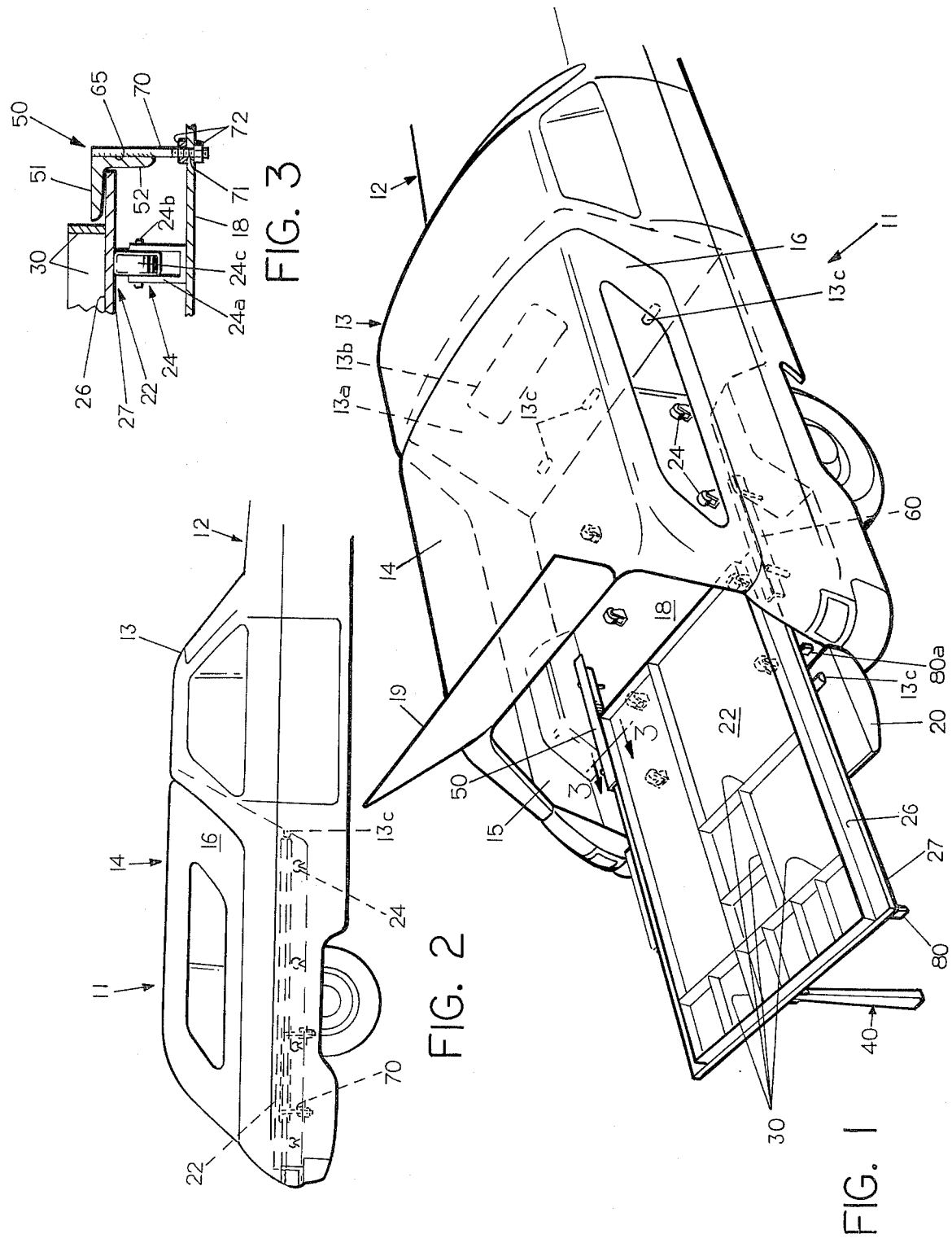

ROLLOUT TRAY FOR PANEL TRUCK BED

The present invention relates generally to the automotive field. More particularly, the present invention relates to a novel modification or "kit" for panel trucks featuring, in the rear cargo compartment, a truck bed or deck normally used for any variety of things.

Panel trucks are employed by a variety of users for a large number of commercial purposes including tradesmen, salesmen, repairmen, etc. to carry a variety of tools, equipment and things in general. Salesmen employ panel trucks and find the rear cargo space convenient for the carrying, in a safe manner away from weather conditions, a variety of sales samples or, in certain cases, the actual goods being sold. Television repairmen, electricians, plumbers and like tradesmen find panel trucks convenient for carrying the tools of the trade such as plumbers' tools, electricians' tools as well as testing equipment, spare parts and the like. Pickup trucks fitted with cap covers are also used in the just described manner.

Unfortunately, panel trucks, as purchased, have only a large singular cargo space in the rear defined by the flat bed, measuring about eight feet (8 ft.) by four feet (4 ft.), the side panels, a connected roof, rear doors which are usually of the double-door variety and a bulkhead between the space and the passenger compartment. As a consequence, whatever is placed or located in the cargo space and upon the bed or deck of the truck shifts or slides or rolls around dependent upon the vagaries of the motion induced by accelerating, braking and turning of the vehicle and dependent, to a certain extent, upon the weight and size of the particular item.

Unfortunately too, the usual panel truck construction requires the individual desiring something from the cargo or storage space to crawl on their knees into the cargo space, where poor interior lighting prevails, in order to find, recover and/or retrieve the desired item; after which a backward crawling ensues with the items grasped in one hand and the first foot groping for the ground. The retrieval effort is thus usually beset by mental frustration, irritation and frequently even by bodily damage from heads striking the top of the roof and shins scraping the rear edge of the bed and elbows or shoulders cracking doors or jams.

A few of the above noted deficiencies and difficulties are recognized in a number of United States patents which, in singular fashion, address themselves to the particular patentee's solution to the particular deficiency. These patents include U.S. Pat. No. 2,982,578, U.S. Pat. No. 3,768,673, U.S. Pat. No. 2,852,303, U.S. Pat. No. 2,549,018, U.S. Pat. No. 3,896,742 and U.S. Pat. No. 2,643,395. Unfortunately, the structures, devices, suggestions and arrangements disclosed in the various patents fail to provide a satisfactory and/or adequate answer or solution to the difficulties described and, in addition, the patented structures are marked by complexity, are cumbersome, are clumsy, expensive and overly complicated.

Significantly too, the structures and arrangements shown in the various patents, both in the uniqueness of the parts and the difficulty of assembly, present unsurmountable hurdles to individuals who might, for reasons of economy or accomplishment or both, desire to perform their own modification and/or create their own modified version.

With the foregoing introduction, it is a general object of the present invention to provide a modification consisting of a uniquely cooperating but simplified assembly of components which, when mounted or combined onto or with the bed of a panel truck or a pickup truck with a cap cover, will serve to convert it or modify it into a form of greatly increased utility accompanied by greatly increased convenience; all at a modest investment of time and/or money.

It is yet another object of the present invention to provide such a modification and/or design which, in addition to overcoming the above enumerated disadvantages, inconveniences and the like, also serves to considerably broaden and enhance the utility of factory delivered panel trucks and the like to the considerable satisfaction of the user.

It is an additional object of the present invention to provide such a modification or modified design which consists of an extremely simple and economical assembly of novelly designed and interrelated parts which are few in number, therefore economical, and, additionally, easily combined and assembled in secure relationship upon a panel truck as permits the coordinated and cooperating parts to be sold in disassembled but ready-to-be assembled "kit" form permitting, thereby, wide distribution to the advantage of a wide sement of the public having need of the item in question.

It is accordingly another object of the present invention to provide the apparatus and/or device of the present invention in the form of a readily saleable and readily assemed "kit".

It is yet another object of the present invention to provide a device or assembly of character described which is possessed of considerable latitude and discretion as exercised by the buyer/user of the "kit".

It is still another object of the present invention to provide such an apparatus consisting of cooperating parts which are, with minor changes, practical for a wide variety of different users and/or different models of pickup trucks and like vehicles.

It is a further object of the present invention to provide a design of interrelated parts which provide a considerable end-use flexibility such that the apparatus, achievable by such design features of the present invention, possesses a considerable amount of universality.

It is still another object of the present invention to provide an apparatus and/or design, as described, which embodies in unique fashion, all of the foregoing features of advantage to thereby lend to it a newness, novelty and uniqueness not previously known or incorporated into devices of the general kind.

The foregoing, as well as other objects of the present invention, will become apparent to those skilled in the art from the following detailed description taken in conjunction with the annexed sheet of drawings on which there is presented, for purposes of illustration only, a single embodiment of the present invention as presently envisioned.

IN THE DRAWINGS

FIG. 1 is a three-quarter (¾) perspective view of a panel truck shown schematically but with parts broken away for purposes of clarity and to show the apparatus of the present invention incorporated into the panel truck.

FIG. 2 is a side elevation view of the panel truck shown in FIG. 1.

FIG. 3 is a sectional view taken on the line 3—3 in FIG. 1.

Viewed most simply, the present invention contemplates in cooperative combination: a pullout tray which is rollable and/or slideable upon the bed of a panel truck, preferably by reason of a spaced array of castors; the pullout tray featuring, on the upper surface, a plurality of cleats or adjustable divider members which may be preselectively located to define any number of different sized compartments and the like; a pair of spaced and securely but easily mounted guiderails constructed and arranged to not only limit the lateral movement of the rollout tray but retain and support the lateral edges as the tray as withdrawn from the fully inward recessed position to an outward accessible position or extended position; together with secure vertically adjustable anchoring means for the guiderails in the bed or in the deck or floor of the panel truck; all of the components going to make up the invention being of relatively staple character, this is readily obtainable parts and all being capable of coassembly in a convenient and facile manner with a minimum of time, skill, dexterity and money.

Referring now more specifically to the drawings, there is disclosed in FIG. 1 a pickup truck 11, inclusive of the hood 12, the cab or passenger compartment 13 and, to the rear, the cargo compartment 14 featuring vertical upstanding sidewalls 15 and 16, connected horizontal roof 17 and the latter all resting on the deck, bed or floor 18. Bulkhead 13a separates the passenger compartment from the cargo compartment and may feature a window 13b.

Access to the cargo compartment is achieved by opening upwardly and downwardly opening rear doors 19 and 20, sometimes referred to as cargo doors. The doors are hingedly connected to the upper and lower edges of the rear of the cargo compartment and, when swung together, the doors meet and latch and lock with a suitable key-opening lock in conventional fashion.

Other component parts of the panel truck are not described herein since they form no part of the present invention.

In accordance with the present invention, a flat panel 22, serving as a rollable tray or platform situated on suitable rollers 24 or castors, is movable from a totally inward or storage position (see FIG. 2) to an outward or access position (see FIG. 1). In addition to the rollers or castors, the tray is supported or secured, in a manner to be more fully described, by a pair of parallel spaced marginal guides situate on the deck and spaced just inward from the side marginal edges of the deck.

Bumpers 13c on the vertical bulkhead 13a between the cab 13 and cargo compartment 14, absorb the shock of the tray 22 being pushed to its extreme inward, recessed or fully stored position. Bumpers 13c are also located on door 20.

As indicated, the planar tray 22 is of rectangular configuration generally matching the rectangular configuration of the deck or bed 18 of the panel truck 11 and features an upper surface 26 and a lower surface 27. The upper surface 26 of the tray bears, in readily removeable but affixed relationship, a plurality of upstanding or linear divider members 30 serving in concert to define a plurality of compartments of various dimensions suitable to meet or serve the individual desires or requirements of the tradesman, mechanic or salesman and, more particularly, to accomodate in orderly fashion, his goods, equipment, samples, tools, spare parts or the like.

Reference numeral 80 identifies a movable stop lock on the underside of the platform tray and serves in conjunction with stop 80a to preclude accidental withdrawal of the entire tray as would otherwise cause spillage and perhaps damage to the tray and items stored in the various compartments thereon.

The cleats or dividers 30 not only form the subcompartments but maintain the contents of the particular subcompartment against shifting due to any movement of the truck by reason of acceleration, braking or negotiating curves or the like. The latter, of course, as alluded to earlier herein, normally result in a mumble-jumble, random, chaotic movement of whatever is in the cargo compartment until the cargo items are scattered helter-skelter and everywhere but where originally located, usually to the consternation, inconvenience and distress of the individual looking for a particular and/or specific item.

Reference numeral 40 identifies a support prop pivotably carried on the most rearward horizontal margin of the tray 22 to assist in supporting the weight of the tray and the items thereon when the tray 22 is pulled completely outward into the position as shown in FIG. 1 at which point the prop support can be pivoted downwardly into contact with the pavement or ground. The support provided by prop 40 is supplemental to the support provided the tray by the construction, arrangement and mounting securement of the identical marginal guide members 50 and 60.

Guide member 50 is shown in cross section in FIG. 3 from which it can be seen that it is of generally L-shaped configuration, having a horizontal leg segment 51 and a vertical leg segment 52. Conveniently, these guide, margin or rail members are formed of angle iron measuring about one inch (1 in.) for each leg and cut to a length of usually about three feet (3 ft.) to, if desired, the specific linear dimension of the bed or deck 18 of the truck. Desirably, each individual guide or rail 50 has welded, as at 65, thereto, at each end, a threaded bolt 70 measuring, for example, five sixteenth inch (5/16 in.) in diameter by four inches (4 in.) in length. The bolt members 70 are then inserted through appropriately located holes 71 drilled through the deck 18 and secured via appropriate adjustment nuts 72 and washers to achieve the desired height for the horizontal leg segment 51 of th guiderail 50 and, of course, the corresponding procedure is followed for guiderail 60. The holes 71 in the deck 18 are also appropriately located so that the vertical leg segments of the guiderails will be spaced apart just sufficiently to accomodate the width of the tray or platform 22 and with suitable allowance for the thickness of the angle iron and the securement bolts 70.

As can be seen in FIG. 1, the horizontal leg segment of guide member 50 and the horizontal leg segment of guide member 60 each overlap opposite edges of tray or platform 22. Desirably, the ends of the bolts 70 (preferably two for each angle iron guide member) are threaded for a considerable extent of their length in order to provide the greatest versatility in terms of vertical positioning of the guide member. This versatility in spacing of platform from the deck allows considerable latitude in the choice or selection of the castors which are available in a variety of types and sizes. The castors 24 consist of a bifurcated bracket 24a spanned by an axle 24b bearing a wheel 24c. There are, of course, a variety of commercially available castors, some of which feature a fixed direction or unidirectional wheel while others feature a ball bearing mounted swivel base allowing three hundred sixty degree (360°) rotation of the individual wheel.

For some applications, the fixed wheel castor will be suitable while, in other applications, the swivel type castor capable of three hundred sixty degree (360°) rotation will be preferable.

The rollout tray or platform 22 may be made of a variety of materials. One-half (½) inch to one (1) inch thick exterior grade marine plywood represents a preferred example of a suitable material. Alternatively, sheet materials of appropriate thickness and strength, formed via moulding of a variety of plastics or synthetic resin materials of one form or another, are available. Such plastics, frequently inclusive of fiber glass filler, are emminently suited by reason of the strength factors associated with such materials. Moulded panels of so-called "ABS" polymers are also possessed of high strength, dimensional stability and good moulding characteristics as to be highly suited.

In accordance with one embodiment of the present invention, the tray is fabaricated to contain a large number of spaced perforations or holes of about three-eights inch (⅜") and thereby adapted to receive pegs projecting from preformed cleat or divider members of appropriate or preselected length and formed of wood or plasic.

In a further preferred embodiment of the present invention, the tray or platform, rather than being rectangular, has an arcuate cutout or cutaway along a marginal edge thereby accomodating a person's body and providing increased and improved access to otherwise remote compartments created by cleat or dividers located on the panel 22.

For convenience, the invention has been illustrated with the castor brackets 24a secured to the deck 18. It will be appreciated, however, that the castor brackets can, if desired for particular purposes, be secured to the bottom surface of the platform or tray 22. For example, with the castors secured to the tray, the removal of the tray leaves the bed or deck 18 clear for general or alternative use other than the bearing of the slidable platform tray and the equipment, etc. thereon. Where general alternate use is desirable, of course, even the guiderails 50 and 60 can be removed by simply removing the four nuts from the four bolts; namely, two at each end of each guiderail.

Most desirably, at least two (2) castors should be placed along each side edge of the platform and spaced inwardly towards the center of the tray just a short distance from the marginal edge. Such placement and spacing desirably enhances the stability of the platform resting on the castors and with the extreme edge sliding against the lower surface of the horizontal segments of the guiderail members 50 and 60.

The location and spacing of the castors, either on the deck 18 or on the underside of the tray or platform 22, is an important consideration in terms of load support stability and ready rollability of the tray or platform outwardly for its intended access and display purpose. Thus, the central region of the platform 22 should be of ample durability and toughness and supported by a sufficient number of the castors as to support the intended weight and distribution of the expected load, be they tools, supplies, samples or the like.

Castor location is also important along the regions spaced just outward from the midline or central axis of the platform. Desirably, at least two castors should be located on each side of the longitudinal centerline of the tray and preferably closer to respective lateral edges than the said longitudinal centerline of the platform. Similarly, castors should be located very close to the rear edge of the deck.

Castor spacing and location as just described provides for contact of the marginal edges of the platform with the overlapped portions of the guiderail in such a manner that the appropriate support of the tray occurs as it is withdrawn into the access position as shown in FIG. 1. Thus, in the position of FIG. 1, it is important to have castor support at the rear edge of the deck and guiderail support, as shown, to avoid tilting or other undesired dislocation of the platform as would circumvent the aims and purposes of the present invention.

The features of the present invention may be incorporated as the panel truck is being manufactured by the original manufacturer or they can be incorporated as an "add on" modification much in the manner of "van" conversions, panel customizing, installation of aluminum "caps" on pickup trucks or the like.

Of course, the apparatus or device of the present invention consisting, as it does, of a minimum of parts either easily obtainable or being useable with only minor changes or modifications lends itself to self installation or modification.

Thus, the features of modification, in accordance with the present invention, may be accomplished by the owner of the vehicle himself. Further considering the fact that the features of advantage comprehend a minimum number of parts; the present invention contemplates the marketing thereof as a "kit" designed in makeup and composition to permit one to modify his own vehicle. The "kit" consists of a select number of parts, as hereinafter enumerated, coupled with an easily followed set of instructions readily understood by one having only a minimal knowledge and/or skill in the use of a few fundamental tools.

In accordance with one embodiment of the present invention, the "kit" consists of the following parts: (a) four carriage bolts (5/16"×4") together with associated nuts and washers, (b) a set of four castors together with appropriate mounting hardware, (c) a stop lock (two pieces) and associated hardware for fixation to the platform and to the deck, (d) an array of bumpers 13c, and (e) a set of instructions to guide the reader (1) in the selection of an appropriately sized rectangle of marine plywood to form the platform, (2) in the selection of a length of wood to form the support 50 and (3) in the selection of two lengths of two inch (2")×two inch (2") angle iron corresponding to the length of the bed or deck of the pickup truck and having one to two inch (1"–2") segments and, additionally, to guide the reader in the assembly of the parts onto the vehicle.

The "kit" is marketable in several ways. One technique would be to simply include the appropriate parts and set of instructions in a suitable plastic or cloth bag. Alternatively, the parts can be coassembled with a suitable cardboard backing and secured thereto in a "blister pack" type of package. Still alternatively, the parts and set of instructions may be assembled in a suitable cardboard box or the like, bearing on the exterior surface suitable visual display information.

Desirably the "kit", in accordance with the present invention, can be aimed for marketing at wholesale lumber supply houses or full service hardwares or full service discount "houses".

Further, in accordance with the present invention, an alternate "kit" would include instructions for welding the two carriage bolts at either end of the angle iron guiderails.

In a further more simplified embodiment, the "kit" would have hardware for securing the carriage bolts to the angle iron, either by bracket or by having holes drilled in the angle iron and the bolt, whereby a nut and bolt securement, rather than welding, serves to secure the carriage bolts to the angle iron; in which case the instructions in this alternate form of "kit" would include appropriate language of assembly, etc.

In accordance with a further embodiment of the present invention, the "kit" would include a plurality of rectangular pieces of perforate fiber board or peg board, together with associated hardware, for securing the individual panels in side-by-side relationship so as to substantially cover the upper surface of the platform. Additionally, in this particular embodiment, the "kit" would include a number of random lengths of wood (one half inch thick by two inches wide) and having spaced holes in the edges of the lengths and, at the same time, the "kit" would include a plurality of clips or pegs adapted to fit in spaced array in the holes in the edges of the random lengths; such that, at the same time, the clips or pegs would fit into perforate openings on the upper surface of the platform as provided by the side-by-side perforate panels. In this form of "kit", the individual could, by use of the lengths of wood and pegs, create an infinite number and/or variety of compartments by any suitable arrangement of the lengths of wood bearing the clips or pegs into appropriate peg holes on the upper surface of the platform.

In accordance with the further embodiment of the present invention, the platform or tray may be formed of a plastic having relatively high strength, including relative high impact strength, coupled with ready moldability; such candidate of plastic might be formed of the so-called "ABS" interpolymer material. In this embodiment, the compartments, cleats or upstanding walls may be a part of the upper surface configuration. Alternatively, the mold design may be such that the upper surface bears a plurality of upstanding pairs of spaced abutments, in concert, defining longitudinal and transverse guideways for a particular thickness of wood segments selected to be of desired length. When a suitable number of lengths are inserted in the guideways, there is created a plurality of customed designed compartments or bins suitable to meet the desires of the individual interested in this particular embodiment.

Modifications and additions may be incorporated into the present invention without departing from the spirit and scope thereof and all such obvious modifications, additions, etc. are intended to be included with the scope of the invention unless such would do violence to the appended claims.

I claim:
1. In cooperative assemblement:
   (1) A vehicle having a cargo compartment inclusive of a flat horizontal bed or deck of generally rectangular configuration,
   (2) a pair of parallel spaced, L-shaped guiderails mounted invertedly along side edges of said deck with the horizontal flanges in facing relationship,
   (3) said guiderail mounting including means for adjusting, in a vertical direction, the spacing of said horizontal flange from said deck,
   (4) a generally rectangular panel located generally coextensively with said deck; said panel having lateral edges adapted to flushly abut the underside of said facing horizontal flange segments of said spaced guiderails,
   (5) a plurality of castors secured to one of said deck and said panel; said castors being constructed and arranged to support said panel and to provide rollability of said panel from a recessed position within said cargo compartment to a position partially to substantially fully withdrawn from said cargo compartment, and
   (6) a plurality of partition members upstandably and releasably secured to said panel for dividing said panel into a plurality of separate compartments; said partition members being accordingly moveable at the will of the user to form any size or shape compartment desired.

2. The combination as claimed in claim 1 wherein said castors are secured to the deck of the vehicle.

3. The combination as claimed in claim 2 wherein at least two of said castors along each side margin of said panel are spaced closer to the guiderail than to the longitudinal center line of said panel.

4. The combination as claimed in claim 3 which includes a support leg hingedly connected along the underside of the rear edge of said panel.

5. In combination, as interrelated and cooperating elements forming a kit for producing a rollout compartmentalized tray for vehicle cargo compartments:
   a plurality of castors having bracket means for securing said castors to the deck of a vehicle cargo compartment,
   attachment means for securing said castors to said deck,
   a plurality of at least four bolts having a cap head and an opposed threaded end,
   a pair of matchingly threaded nuts for each of said bolts,
   a plurality of random lengths of wood of preselected thickness of from one-eighth inch to one-half inch and a width measuring from one inch to six inches,
   a plurality of releasable fastener means adapted for releasable securement of said lengths to an associated wooden panel and
   a written set of instructions describing the assembly operations for combining the above elements with a pair of flanged L-shaped guiderails and a planar generally rectangular piece of wood or the like to yield said rollout tray for a rear deck of a vehicle cargo compartment, said instructions calling for
   (1) securing said pair of flanged guiderails to said rear deck using said four bolts through appropriate holes in said deck, two attached to each guiderail, and in spaced parallel relationship corresponding to the size of said flat rectangular piece of wood or the like so that said lateral edges of said tray underlie said horizontal leg segment of said L-shaped guiderails, and
   (2) securement and location of said castors a short horizontal distance toward the center of said deck away from said guiderails.

6. The combination, as claimed in claim 5, which includes a plurality of adjustment nuts and washers for each bolt whereby said guiderails and tray are vertically adjustable with respect to said deck.

* * * * *